May 28, 1963 L. VISCOLOSI 3,091,007
HINGED WEATHER STRIP FOR DOORS
Filed Oct. 14, 1960 2 Sheets-Sheet 1
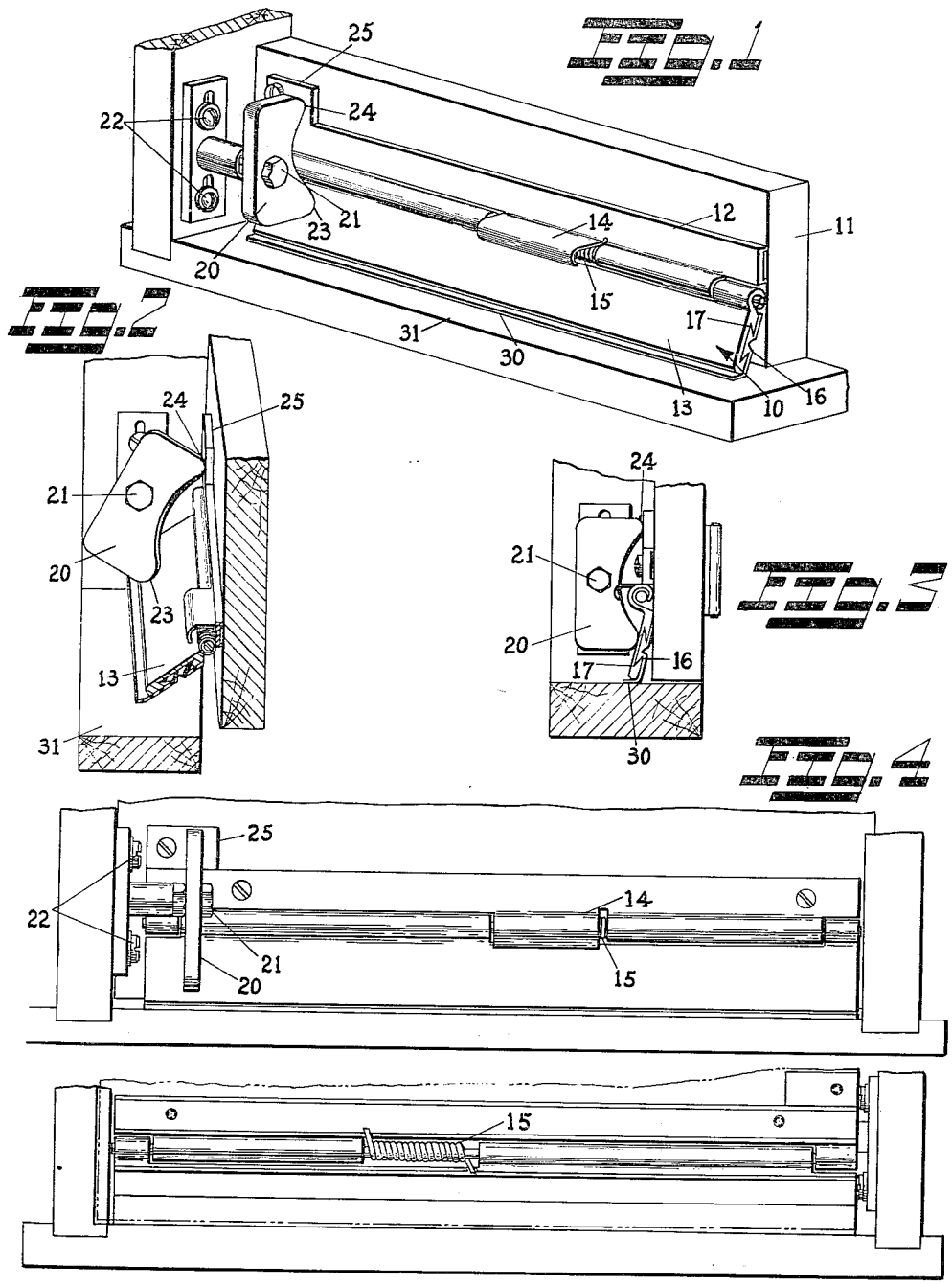
INVENTOR.
LOUIS VISCOLOSI
BY
William Frederick Werner
ATTORNEY May 28, 1963 L. VISCOLOSI 3,091,007
HINGED WEATHER STRIP FOR DOORS
Filed Oct. 14, 1960 2 Sheets-Sheet 2
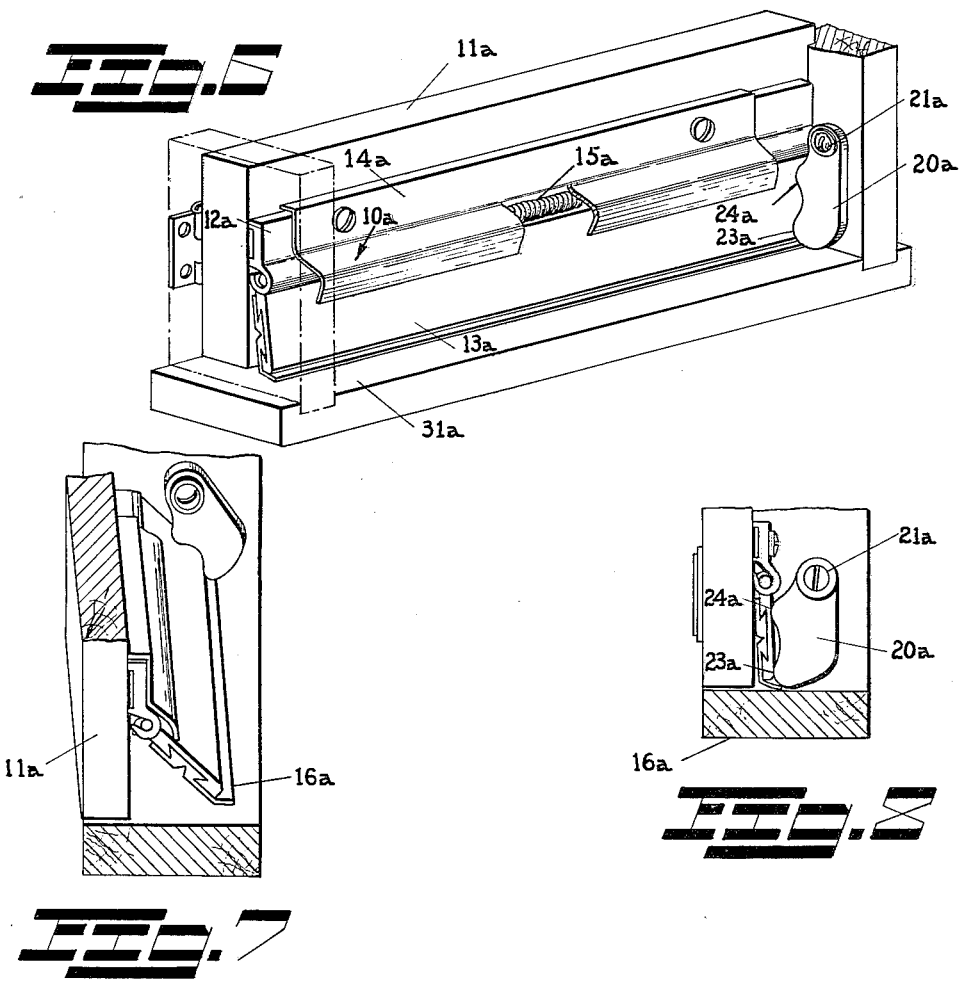
INVENTOR.
LOUIS VISCOLOSI
BY
William Frederick Werner
ATTORNEY

United States Patent Office 3,091,007
Patented May 28, 1963

3,091,007
HINGED WEATHER STRIP FOR DOORS
Louis Viscolosi, 73 Unit St., Providence, R.I.
Filed Oct. 14, 1960, Ser. No. 62,749
1 Claim. (Cl. 20—67)

This invention relates to weather strips and more particularly to a swingable, hinged weather strip for the meeting edges of a door, especially at the door bottom.

An object of the present invention is to provide a weather strip for a single door closure which moves out of interfering orientation when the door is opened but provides a positive seal when the door is closed.

Another object of the present invention is to provide a swingable weather strip having a pivoted member to provide a positive closure to said seal.

Other objects will become clear from a perusal of the following specification, claim and drawings in which:

FIGURE 1 is a perspective elevation of the improved weather strip on a door in a fully closed position.

FIGURE 2 is a perspective end view of the improved weather strip on a door in a partially open position.

FIGURE 3 is an end view of the improved weather strip on a door in closed position.

FIGURE 4 is a front elevation of the improved weather strip on a closed door.

FIGURE 5 is a rear elevation of the improved weather strip as viewed through the attached closed door.

FIGURE 6 is a perspective elevation of an improved weather strip with another embodiment of a closure device in conjunction with a closed door.

FIGURE 7 is an end perspective of the arrangement of FIGURE 6 showing the door in partially open position.

FIGURE 8 is an end view of the arrangement of FIGURE 6 showing the door in closed position.

Referring more particularly to the drawing in which like numbers designate like features 10 indicates the improved weather strip fastened to the bottom of a door 11. The weather strip is made up of two hinged substantially flat sections 12 and 13 oriented side by side. A small hood 14 encloses a coil spring 15. This constantly urges the lower section 13 upwardly to an open position. The lower section 13 has a sealing strip 16 locked in a dove tail shaped groove 17. The strip may be of a rubber, rubber-like or plastic material however the preferred material is a polyvinyl plastic.

To close the weather strip and retain it in closed position a closure member 20 pivoted at 21 is adjustably fastened to the side of the door jamb by two screws 22. The closure member has two contact points 23 and 24 the latter of which terminates on a face plate 25. This face plate may or may not be made integral with the section 12 as discretion requires.

Looking more closely at the closure member 20 it will be seen that the center of mass is below the pivot 21 thereby constantly presenting the contact points 23 and 24 toward the weather strip.

The operation of the improved weather strip is as follows: The section 13 is normally biased by spring 15 to an open position. The hood 14 not only protects the spring but acts as a stop to prevent the section 13 from coming in contact with section 12. The hood also maintains the section 13 in a proper position for engagement by the closure member 20. As the door 11 is closed, lower contact point 23 engages the sloping outer surface of section 13 which acts as a cam to rotate the closure member 20 about pivot 21 and bring contact point 24 against face plate 25 (see FIGURE 2). Henceforth, because of the three point contact (23, 24 and pivot 21), the closure member while slidingly engaging the weather strip 12 forces section 13 downwardly. This causes the exposed lip 30 of sealing strip 16 to be pressed into firm contact with the door frame, in this case threshold 31. The result is a weather tight seal at the selected edge of the door.

In FIGURES 6 to 8 there is presented a slightly different form of weather strip 10a with a different embodiment of closure member 20a. As in FIGURE 1 the weather strip is constructed of two sections shown here as 12a and 13a. The hood 14a however extends the full length of the weather strip and protects not only the coil spring 15a but the entire hinged construction of the weather strip. This hood 14a is a separate member, unlike the integral construction of FIGURE 1.

The closure member 20a is pivotally fastened to a door jamb at 21a and hangs downwardly therefrom in a substantially vertical orientation. Like the previously described closure member there are two contact points 23a and 24a which slidingly engage the weather strip. However, both contact points slidingly engage the lower section 13a, whereas in FIGURE 1 the contact points 23 and 24 respectively engage the lower section 13 and the upper section 12.

The operation of the second embodiment is very similar to the first embodiment. The section 13a is normally biased open by spring 15a, the upward position being limited by the hood 14a. As the door 11a is closed, lower contact point 23a will first engage the sloping outer surface of 13a. Acting as a cam this sloping surface will cause closure member 20a to rotate about pivot 21a and bring contact point 24a against the outer surface of 13a (see FIGURE 8). Because of the three point contact (23a, 24a and 21a) the closure member in its sliding engagement will cause the section 13a to firmly press downwardly on sealing strip 16a. The result is a weather tight seal between the door and frame, shown here as threshold 31a.

Having shown and described preferred embodiments of the present invention, by way of example, it should be realized that structural changes could be made and other examples given without departing from either the spirit or scope of this invention.

What I claim is:

A weather strip for a door comprising a pair of substantially flat strips pivotally joined side by side by a hinged connection, one of said strips being fastened to said door and the other of said strips overlapping a crevice normally existing between said door and an adjoining door frame, resilient means for normally urging said other strip pivotally away from said crevice, a hood over said resilient means for limiting the pivotal movement of said other strip, a closure member pivotal on a pivot means attached to said adjoining door frame and having its pivot point located above the center of its mass and provided with two contact points, one contact point located above said pivot point for engagement with said strip fastened to said door, and the other contact point located below the pivot point for engagement with the other of said strips, whereby the mass of said closure member below said pivot point is opposed by said resilient means through the other of said strips.

References Cited in the file of this patent

UNITED STATES PATENTS

| | | |
|---|---|---|
| 238,877 | Fiester | Mar. 15, 1881 |
| 888,131 | Wade | May 19, 1908 |
| 2,321,730 | Benson | June 15, 1943 |
| 2,541,451 | Webster | Feb. 13, 1951 |
| 2,786,244 | Rapin | Mar. 26, 1957 |